Patented Aug. 21, 1928.

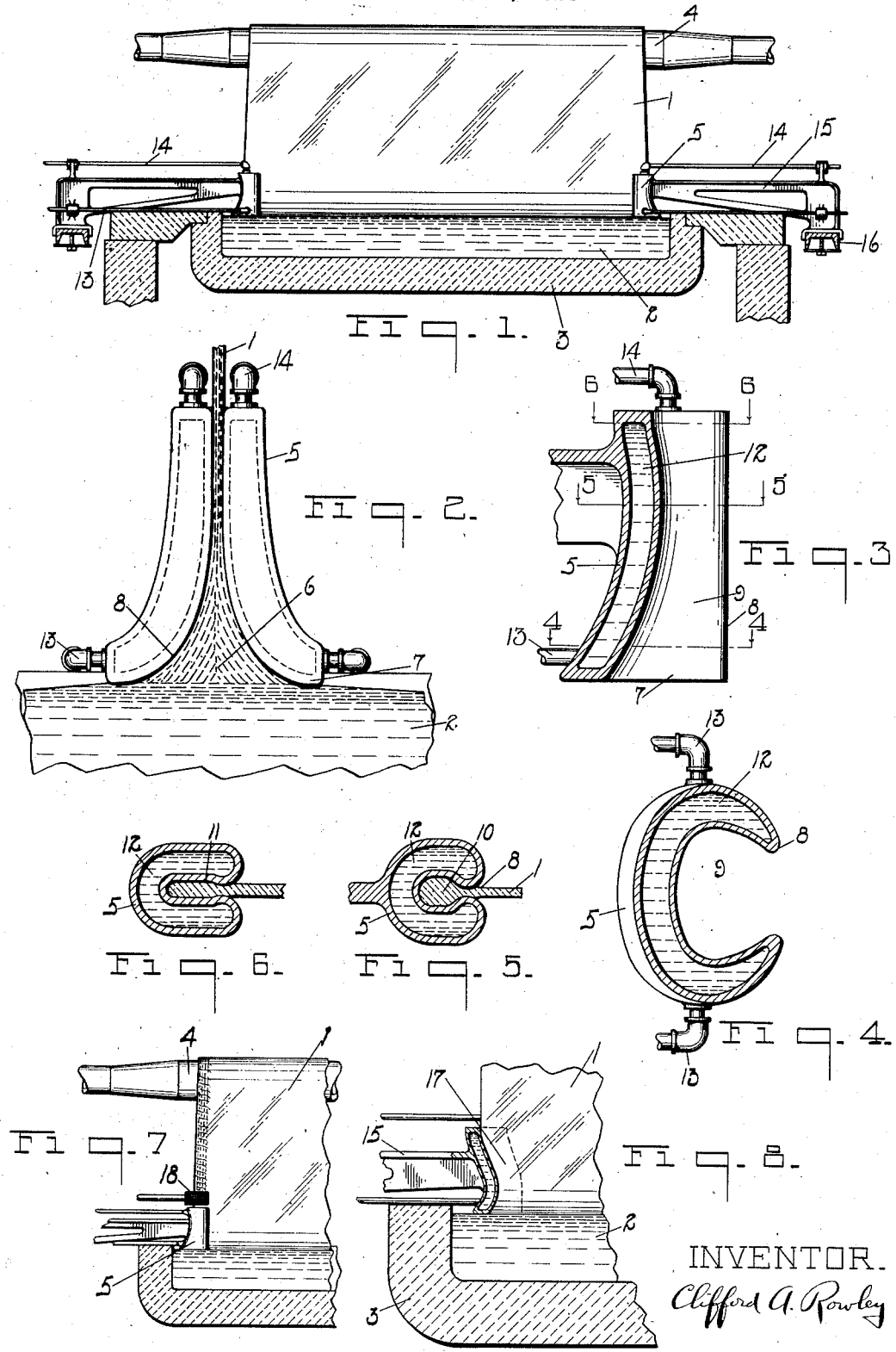

1,681,258

UNITED STATES PATENT OFFICE.

CLIFFORD A. ROWLEY, OF TOLEDO, OHIO, ASSIGNOR TO THE LIBBEY-OWENS SHEET GLASS COMPANY, OF TOLEDO, OHIO, A CORPORATION OF OHIO.

WIDTH MAINTAINER FOR CONTINUOUS SHEET GLASS.

Application filed March 24, 1924. Serial No. 701,313.

This invention relates to improvements in the art of drawing sheet glass, and more particularly to an improved process and apparatus for maintaining the width of the sheet during its initial forming period, and imparting lateral tension thereto.

According to this invention the edge portions of the upwardly drawn glass sheet, from their source through the initial forming zone, are drawn through edge-forming and directing passages in stationary internally cooled metallic members positioned at the sides of the path of the upwardly moving sheet. These passages are so formed as to first envelope and gradually grip the flaring upwardly projecting mass of glass or "meniscus" at the sheet source, confine a portion of the glass adjacent the sheet edge to form a bead thereon which is gripped by inwardly projecting lips at the sides of the slotted passage, guide these beaded edges upwardly along a predetermined path and prevent the inward contraction of the sheet during this period, and finally substantially flatten out the upper edges of the bead adjacent the forming members to eliminate the excessively thickened edges on the glass sheet.

The objects and advantages of the invention will be more clearly understood from the following detailed description of certain approved forms of the apparatus.

In the accompanying drawings:

Fig. 1 is an elevation of the apparatus showing the sheet edge directing members in position at each side of the sheet, the pot or receptacle containing the molten glass being shown in vertical section.

Fig. 2 is an elevation, on an enlarged scale, of one of the edge-forming members, this view being taken at right angles to Fig. 1, and the sheet being shown in vertical section.

Fig. 3 is a central vertical section through one of the edge-forming members.

Fig. 4 is a horizontal section through this member taken substantially on the line 4—4 of Fig. 3.

Fig. 5 is a horizontal section taken substantially on the line 5—5 of Fig. 3.

Fig. 6 is a horizontal section taken substantially on the line 6—6 of Fig. 3. In Figs. 5 and 6 a portion of the sheet edge is shown to illustrate the gripping action.

Fig. 7 is a partial elevation of a modified form of the apparatus.

Fig. 8 is a similar view of another modification.

As shown in Fig. 1, the glass sheet 1 is drawn upwardly from the pool of molten glass 2 in receptacle 3 and then bent into the horizontal plane about a cooled bending roller 4. This is similar to the sheet drawing system disclosed in the patent to I. W. Colburn, 1,248,809, granted Dec. 4, 1917. It is to be understood that this system of drawing the sheet is merely shown by way of example, and that the edge-forming members hereinafter described are adapted for use with other systems of drawing sheet glass. In other words, it is not absolutely essential that the sheet 1 be bent into the horizontal about roller 4 as here illustrated.

Enveloping each edge portion of the sheet at its source and for a certain distance thereabove, is a stationary metallic forming and directing member 5 of a design more particularly shown in Figs. 2 to 6 of the drawings. When glass is drawn upwardly in sheet form from a rather cool plastic body of molten glass, a wide flaring source or so-called "meniscus" as shown at 6 will be formed directly above the surface of the molten pool. Each forming member 5 is provided with an inner passage designed to encompass this meniscus 6 at is lower end and as the sheet edge is drawn upwardly therethrough form and retain a thickened beaded edge on the sheet, and by means of its grasp on this thickened edge hold the sheet to width while it is being drawn upward through its initial forming zone.

The extreme lower edge of each member 5 has a wide U-shaped skirt 7 which substantially surrounds the natural base of the meniscus 6. Directly thereabove the inner edges 8 which define the slot at the inner side of passage 9 begin to approach one another, as shown in Fig. 4, so as to grasp and retain a relatively large body of the plastic glass within the forming member 5. Thereabove the passage 9 becomes rapidly smaller and the lips 8 approach more closely together until a horizontal cross-section through the former appears substantially as shown in Fig. 5. The lips 8 are here spaced a distance apart approximately equal to that of the normal thickness of the glass sheet. The passage 9 here has a substantially circular conformation in which is formed a beaded edge 10 on glass sheet 1, which is held within the passage by the closely adjacent lips 8.

The member 5 retains substantially the conformation just described through the greater portion of its height, except that the size of the circular bead retaining passage 9 gradually diminishes since the sheet is gradually elongated and diminishes in size during this portion of its upward travel. Adjacent its extreme upper end, as shown in Fig. 6, the conformation of passage 9 changes from the substantially circular form shown in Fig. 5 to the flattened form shown at 11 in Fig. 6. The glass at this point is still sufficiently plastic to enable the bead 10 to be flattened out to the form shown at 11. This portion 11 may be only slightly thicker than the main body portion of glass sheet 1, and is better adapted than bead 10 for the passage about the bending roller 4 and through the drawing mechanism.

The directing member 5 is formed of some suitable heat-resisting metallic alloy such as nichrome. The walls of the member are hollow as indicated at 12 and a cooling fluid such as water is continuously forced in through the pipes 13 adjacent the lower edge of the member, the water flowing out through pipes 14 at the top of member 5. The cooling action of this water will maintain the metallic forming member at such a temperature that it will not be injured by the hot plastic glass and will also prevent the hot glass from sticking to the metal as it slides therethrough. The walls of inner passage 9 are preferably polished to facilitate this sliding action. As shown in Fig. 1 each member 5 is supported at the inner end of a beam or truss 15 carried in any suitable manner at its outer end on supporting beam 16. Of course any suitable means may be provided for adjusting these mechanisms inwardly or outwardly with relation to the walls of pot 3, but such adjusting means has not been illustrated.

Sufficient lateral tension will ordinarily be imparted to the sheet by holding the sheet edges to a vertical path of travel against the sheet's natural tendency to contract while cooling. However, if it is desired to impart additional tension, or a positive lateral stretching to the sheet, it is only necessary to design the member 5 in the form shown in Fig. 8. Here the intermediate portion 17 of the former, wherein the beaded edge of the sheet is formed and gripped (as in Fig. 5), slopes outwardly away from the centerline of the sheet at any desired angle, thus compelling a corresponding outward movement of the sheet edge and imparting a sidewise stretch to the entire body of the sheet. Otherwise, this form of apparatus is the same as that previously described.

If desired or found necessary, a pair of driven edge drawing rollers 18 may be mounted directly above the top of each forming member 5 to positively grasp the edge of the sheet and draw it upwardly through the passage 9 in the directing member. This construction is indicated in Fig. 7.

The use of this invention will produce a wider sheet than could otherwise be obtained, and will tend to prevent the formation of waves or wrinkles in the sheet during its initial forming period.

Claims:

1. In the art of drawing sheet glass from a mass of molten glass, the process of maintaining the width of the sheet during its initial forming period, consisting in surrounding the sheet source at its edge in a manner to form a beaded edge portion on the sheet and to continuously confine and direct this edge along a predetermined path of travel, and then eliminating the beaded edge while it is still plastic.

2. In sheet glass drawing apparatus, a sheet edge directing member comprising a stationary casing having a vertical sheet edge engaging passage with an open slot at its inner side, the lower portion of the passage having an open flared mouth to allow unrestricted entrance of the glass at the sheet source, and the upper portion of the passage being restricted to grip the sheet edge.

3. In sheet glass drawing apparatus, a sheet edge directing member comprising a stationary metallic casing having a vertical sheet edge engaging passage with an open slot at its inner side, the lower portion of the passage having an open flared mouth to allow unrestricted entrance of the glass at the sheet source, and the upper portion of the passage being restricted to grip the sheet edge.

4. In sheet glass drawing apparatus, a sheet edge directing member comprising a stationary internally cooled casing having a vertical sheet edge engaging passage with an open slot at its inner side, the lower portion of the passage having an open flared mouth to allow unrestricted entrance of the glass at the sheet source, and the upper portion of the passage being restricted to grip the sheet edge.

5. In sheet glass drawing apparatus, a sheet edge directing member comprising a stationary internally cooled metallic casing having a vertical sheet edge engaging passage with an open slot at its inner side, the lower portion of the passage having an open flared mouth to allow unrestricted entrance of the glass at the sheet source, and the upper portion of the passage being restricted to grip the sheet edge.

6. In sheet glass drawing apparatus, a sheet edge directing member comprising a stationary casing having a vertical sheet edge engaging passage with an open slot at its inner side, the lower portion of the passage having an open flared mouth to allow unrestricted entrance of the glass at the sheet source, the upper portion of the passage being smaller and the open slot being restricted to form a beaded edge on the sheet and positively grip the same.

7. In sheet glass drawing apparatus, a sheet edge directing member comprising a stationary casing having a vertical sheet edge engaging passage with an open slot at its inner side, the lower portion of the passage having an open flared mouth to alow unrestricted entrance of the glass at the sheet source, the upper portion of the passage being smaller and the open slot being restricted to form a beaded edge on the sheet and positively grip the same, the extreme upper portion of the passage being flattened out to approximately the width of the slot.

8. In sheet glass drawing apparatus, a sheet edge directing member comprising a stationary casing having a vertical sheet edge engaging passage with an open slot at its inner side, the lower portion of the passage having an open flared mouth to allow unrestricted entrance of the glass at the sheet source, and the upper portion of the passage being restricted to grip the sheet edge, the restricted upper portion of the passage sloping outwardly to stretch the sheet laterally.

9. In sheet glass drawing apparatus, a sheet edge directing member comprising a stationary casing having a vertical sheet edge engaging passage with an open slot at its inner side, the lower portion of the passage having an open flared mouth to allow unrestricted entrance of the glass at the sheet source, the upper portion of the passage being smaller and the open slot being restricted to form a beaded edge on the sheet and positively grip the same, the portion of the slot engaging the beaded edge of the sheet sloping outwardly to stretch the sheet laterally.

10. In sheet glass drawing apparatus, a sheet edge directing member comprising a stationary casing having a vertical sheet edge engaging passage with an open slot at its inner side, the lower portion of the passage having an open flared mouth to allow unrestricted entrance of the glass at the sheet source, and the upper portion of the passage being restricted to grip the sheet edge, in combination with rotary drawing means positioned directly above the member to draw the sheet edge through the passage.

11. In sheet glass apparatus, means for drawing a sheet from a mass of molten glass, and a block arranged at each edge of the sheet and contacting therewith, said block being disposed above the surface of the molten glass.

12. In sheet glass apparatus, means for drawing a sheet from a mass of molten glass, and a metallic slotted block arranged at each edge of the sheet and contacting therewith, said block being disposed above the surface of the molten glass.

13. In sheet glass apparatus, means for drawing a sheet from a mass of molten glass, a metallic slotted block arranged at each edge of the sheet and contacting therewith, said block being disposed above the surface of the molten glass, and means for controlling the temperature of the said slotted block.

14. In sheet glass apparatus, means for drawing a sheet from a mass of molten glass, and means arranged above the surface of the molten glass and contacting with the sheet for forming an enlarged edge thereon.

15. In sheet glass apparatus, means for drawing a sheet from a mass of molten glass, and means arranged above the surface of the molten glass and contacting with the sheet for forming a beaded edge thereon.

16. In sheet glass apparatus, means for drawing a sheet from a mass of molten glass, means arranged above the surface of the molten glass and contacting with the sheet for forming a beaded edge thereon, and means for controlling the temperature of said edge forming means.

17. In sheet glass apparatus, means for drawing a sheet from a mass of molten glass, a slotted member located external of the molten bath and arranged at each edge of the sheet for contact therewith, each member forming a curved chamber adapted to contain a temperature controlling medium.

18. In sheet glass apparatus, means for drawing a sheet from a mass of molten glass, a slotted member located external of the molten bath and arranged at each edge of the sheet for contact therewith, each slotted member having a curved heat conducting surface from which heat is dissipated, the slot of said member extending from the top to the bottom thereof, the sheet edge contacting with the member within said slot.

19. In sheet glass apparatus, means for drawing a sheet from a mass of molten glass, a slotted member located external of the molten bath and arranged at each edge of the sheet for contact therewith and above the surface of the molten glass from which the sheet is drawn, each slotted member having a curved heat conducting surface from which heat is dissipated, each sheet edge contacting with its respective slotted member in the slot thereof only.

20. In sheet glass apparatus, means for drawing a sheet from a mass of molten glass, a slotted member located external of the molten bath and arranged at each edge of the sheet for contact therewith and above the surface of the molten glass from which the sheet is drawn, each slotted member having a curved heat conducting surface which envelops the sheet edge from its source upwardly for a substantial distance and from which heat is dissipated, each sheet edge contacting with its respective slotted member in the slot thereof only.

21. In sheet glass apparatus, in combination with means for drawing a sheet of glass from a molten bath, a member located external of the molten bath and arranged at each edge of the sheet for contact therewith, said member being provided with a slot for the receipt of the sheet edge, the walls of said member being curved in a plane parallel to the plane of the sheet, and also curved in a plane at right angles thereto.

Signed at Toledo, in the county of Lucas, and State of Ohio, this 22d day of March, 1924.

CLIFFORD A. ROWLEY.